March 15, 1960
D. H. MASH
2,928,974
ELECTRO-LUMINESCENT DEVICE
Filed June 28, 1955
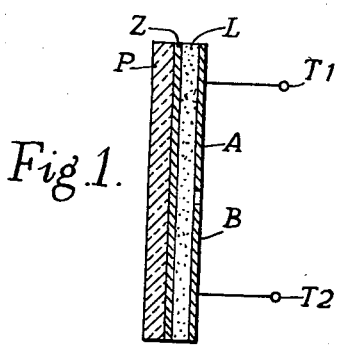
Fig.1.
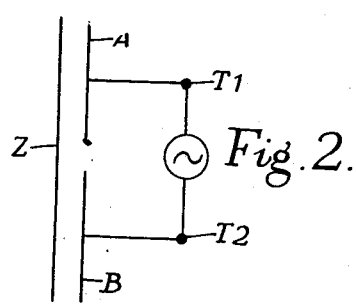
Fig.2.
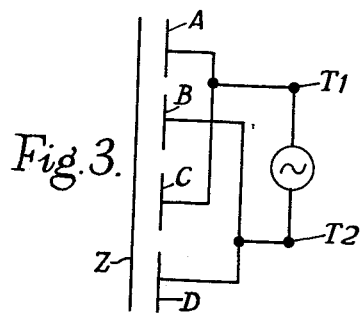
Fig.3.
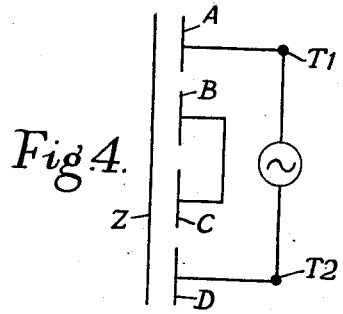
Fig.4.
Fig.5.
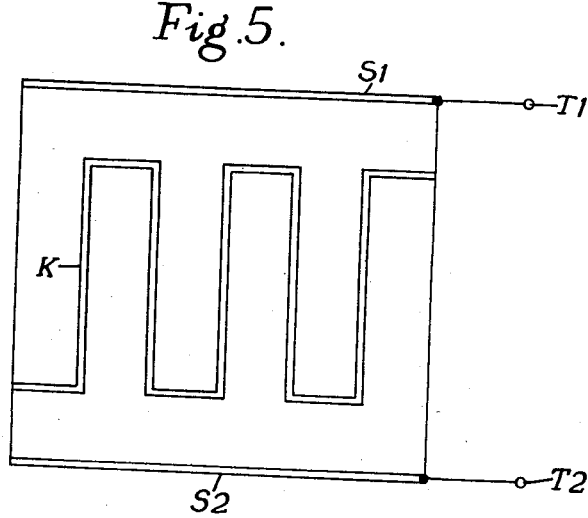
INVENTOR
DEREK HUBERT MASH
BY
J. Albert Holtzwart
ATTORNEY

United States Patent Office 2,928,974
Patented Mar. 15, 1960

2,928,974

ELECTRO-LUMINESCENT DEVICE

Derek Hubert Mash, London, England, assignor to Thorn Electrical Industries Limited, London, England Application June 28, 1955, Serial No. 518,557

Claims priority, application Great Britain July 2, 1954

6 Claims. (Cl. 313—108)

The present invention relates to electro-luminescent devices, that is to say devices comprising two electrodes having between them a layer of electro-luminescent material, that is material adapted to emit light when a suitable alternating potential difference is applied between the electrodes. The devices are electro-luminescent condensers, the electrodes constituting the plates of the condensers. One of the electrodes is made transparent in order that the light may emerge therethrough. The other electrode, referred to as the backing electrode need not be, and usually is not, transparent.

The transparent electrode has to be sufficiently conducting to carry the required current from a terminal thereon to all parts of its surface without excessive drop in voltage, since any voltage drop shows itself as a progressive decrease in brightness in a direction away from the terminal.

The provision of adequate conductivity in combination with adequate transparency introduces difficulties in practice. Moreover the transparent conductive coatings hitherto employed have required glass as a base (for instance the glass has been treated when hot with a compound of tin) and this is an undesirable limitation, since for some purposes it may be desirable to use other transparent bases, for instance plastics. Moreover the known methods of forming the transparent conducting coatings are relatively costly and tedious.

There are, however, known methods of producing transparent coatings which are relatively cheap and simple, but the conductivity of these coatings while sufficient for such purposes as the elimination of static charges is not sufficient for use in a conventional electro-luminescent lamp.

The invention has for its principal object to provide an electro-luminescent lamp in which there can be used such partially-conducting transparent surfaces as are referred to in the preceding paragraph. This allows the use of a cheaper and simpler process in making the lamps, whether the base be of glass or other material, and also makes possible the use of material for the base, other than glass, such for instance as a plastic, which may be flexible.

The invention is based upon the realisation that the voltage drop across a portion of a conducting surface carrying current increases with the resistance of the surface and also with the current passing. From this it follows that the shorter the distance along the conducting surface that the current has to travel the smaller will be the voltage drop, since the resistance will be less, and also that the smaller the area of electro-luminescent condenser served by the conducting surface the lower will be the voltage drop, since the current will be less. Hence, by making use of this fact the voltage drop across the surface can be reduced for two distinct reasons.

According to the present invention, an electro-luminescent lamp comprises a transparent conducting electrode and a backing electrode having between them a layer of electro-luminescent material, wherein the backing electrode is divided into a plurality of mutually-insulated parts, terminals for the application of an alternating current to operate the device being connected to the said parts. Preferably the backing electrode is divided into an even number of parts.

The invention will be described with reference to the accompanying drawing in which Fig. 1 is a view in section of a simple embodiment of the invention, Fig. 2 is an equivalent circuit diagram of the embodiment in Fig. 1, Figs. 3 and 4 are equivalent circuit diagrams of other embodiments of the invention, and Fig. 5 is a view of a backing plate for use in another embodiment of the invention.

In Fig. 1, a transparent support P is coated with a transparent conducting layer Z and this layer is coated with electro-luminescent material L provided with a backing electrode divided into two mutually-insulated parts A and B. An alternating voltage is applied at terminals $T_1$ and $T_2$ between the two parts A and B and the path of current is then from A to Z and from Z to B. Thus the lamp will emit light even though the coating Z is not connected directly to the supply. As is evident from the equivalent circuit diagram of Fig. 2, such a lamp is in effect two lamps operated in series, and, for equal brightness, the voltage required is double that of the conventional lamp while the current is halved.

To the extent that the coating Z is only partially conducting, a voltage drop will occur when current passes through it, and this voltage drop will be determined by, firstly, the area of the halves A and B of the back plate (since the current passed increases with the area) and, secondly, by the length of the coating Z that the current has to traverse. This length will increase with the distance of any point on the coating Z from the isolating division between the back electrodes A and B, and consequently such a lamp having a partially conducting coating Z shows a regular reduction in brightness away from the division.

The variation in brightness for a given coating Z can be reduced by increasing the number of mutually insulated parts into which the backing electrode is divided. Thus as shown in Fig. 3, using four such parts, A, B, C, and D the supply may have one terminal $T_1$ connected to A and C and the other $T_2$ to B and D. The paths of the current from supply terminal $T_1$ to supply terminal $T_2$ are then $T_1$, A, Z, B, $T_2$ and $T_1$, C, Z, D, $T_2$ in parallel. In this example the total effective capacitance between the supply terminals is the same as that in the previous example, in which the backing electrode is divided into two parts, and the voltage and current conditions are therefore the same. However, the maximum voltage drop is less than in the example of Figs. 1 and 2.

When all the four capacitances are equal there is no current in the coating Z over the region between the parts thereof opposite the parts B and C of the backing electrode and the coating Z could therefore be divided in this region. No advantage in thus dividing the coating Z is known and since the capacitances will not always be exactly equal it is usually preferable to use a continuous coating Z.

It is not essential that all the parts of the backing electrode should be connected to the supply terminals. Thus, for instance, as shown in Fig. 4, the supply terminals $T_1$ and $T_2$ may be connected to parts A and D and parts C and D may be connected together, or may be continuous. A higher voltage is then needed for the same brightness and the light emission is less uniform.

A semi-conducting transparent coating Z suitable for use in carrying out the present invention can conveniently be prepared by spraying, painting or flooding a transparent base with a weak suspension of graphite in suitable vehicles such as water or alcohol. What is known as de-flocculated graphite is suitable. When a layer of graphite of suitable thickness has been applied, the surface is lightly polished in order to increase its conductivity. Alternatively the base may be coated chemically or by vacuum evaporation or sputtering with a thin transparent film of silver, aluminium or other suitable metal.

The electro-luminescent material L of Fig. 1 may then be applied to the semi-conducting coating Z by a method such as one of those described in the specification of United States patent application Serial No. 472,193, filed November 30, 1954 by D. H. Mash, and having the same assignee as the present application. A light-reflecting coating may be applied over the electro-luminescent material L if desired. The backing electrode A, B may then be applied to the surface of the luminescent material, or the light-reflecting coating respectively. In a preferred embodiment of the invention, the backing electrode consists of a layer of lead dioxide, as described in the specification of United States patent application Serial No. 507,384, filed May 10, 1955 by D. H. Mash, and having the same assignee as the present application and the coating of lead dioxide is divided into the required number of parts by scratching or cutting through this coating.

One convenient form that the backing electrode may take is shown in Fig. 5 and is produced by dividing a rectangular coating of lead dioxide or other material along a rectangular zig-zag line K. Terminal strips $S_1$ and $S_2$ are provided in contact with the coating along two opposite edges. The zig-zag line divides the width (parallel to the terminal strips) into six parts of equal width and the minimum breadth of the coating between the zig-zag and the terminal strips is made about equal to the width of the said parts. The backing electrode is thus in the form of two sets each of three fingers interleaved with one another.

In an alternative method of making a lamp according to this invention, the order of construction previously described is reversed. Thus a backing electrode is first applied as a continuous coating to a suitable insulating support, which need not be transparent and may therefore be a wall or ceiling. The backing electrode is then divided as required and the electro-luminescent layer is applied to the exposed surface of the backing electrode. The exposed surface of the electro-luminescent layer is then coated with a thin film of graphite which is polished lightly as previously described.

I claim:

1. An electro-luminescent device comprising a transparent conducting electrode, a backing electrode divided into a plurality of mutually-insulated parts, a layer of electro-luminescent material between said electrodes, terminals for applying a voltage between at least two said mutually insulated parts of the backing electrode being connected to said mutually-insulated parts, and a source of voltage connected between said terminals.

2. An electro-luminescent device comprising a transparent conducting electrode, a backing electrode divided into a number of parts greater than two, a layer of electro-luminescent material between said electrodes, two terminals for connection to an energising current source, means connecting at least two of said parts to one of said terminals, means connecting the remainder of said parts to the other of said terminals, and a source of voltage connected between said terminals.

3. An electro-luminescent device according to claim 1 wherein the number of said parts is even.

4. An electro-luminescent device according to claim 1 wherein each of said parts includes a plurality of fingers, the fingers of one part interleaving with the fingers of another part.

5. An electro-luminescent device according to claim 1 wherein said transparent conducting layer is continuous.

6. An electro-luminescent device comprising an electrically-conductive sheet electrode and a backing electrode having between them a layer of electro-luminescent material, at least one of said electrodes being of transparent conductive material, said backing electrode being divided into a plurality of mutually-insulated parts, terminals for the application of an alternating voltage between at least two said mutually-insulated parts of the backing electrode being connected to said mutually-insulated parts, and a source of alternating voltage connected between said terminals, said electrically-conductive sheet electrode being connected to said source of alternating voltage only indirectly through said electrodes.

References Cited in the file of this patent

UNITED STATES PATENTS

| | | |
|---|---|---|
| 1,779,748 | Nicolson | Oct. 28, 1930 |
| 2,684,450 | Mager | July 20, 1954 |
| 2,698,915 | Piper | Jan. 4, 1955 |
| 2,768,310 | Kazan | Oct. 23, 1956 |
| 2,773,216 | Edmonds | Dec. 4, 1956 |